United States Patent
Johnson et al.

(10) Patent No.: US 12,276,896 B2
(45) Date of Patent: *Apr. 15, 2025

(54) TUNABLE ORBITAL ANGULAR MOMENTUM SYSTEM

(71) Applicant: Clemson University, Clemson, SC (US)

(72) Inventors: Eric G. Johnson, Clemson, SC (US); Jerome Keith Miller, Clemson, SC (US); Richard Watkins, Clemson, SC (US); Kaitlyn Morgan, Clemson, SC (US); Wenzhe Li, Clemson, SC (US); Yuan Li, Clemson, SC (US)

(73) Assignee: Clemson University, Clemson, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/838,632

(22) Filed: Jun. 13, 2022

(65) Prior Publication Data

US 2022/0390810 A1 Dec. 8, 2022

Related U.S. Application Data

(63) Continuation of application No. 16/725,293, filed on Dec. 23, 2019, now Pat. No. 11,402,722.

(60) Provisional application No. 62/784,202, filed on Dec. 21, 2018.

(51) Int. Cl.
*G02F 1/33* (2006.01)
*H04B 10/27* (2013.01)

(52) U.S. Cl.
CPC .............. *G02F 1/33* (2013.01); *H04B 10/27* (2013.01)

(58) Field of Classification Search
CPC ....... H04B 10/27; G02F 1/33; G02B 21/0032; G02B 27/0988
See application file for complete search history.

(56) References Cited

U.S. PATENT DOCUMENTS

| | | | |
|---|---|---|---|
| 11,402,722 B2* | 8/2022 | Johnson | H04B 10/27 |
| 2004/0004746 A1* | 1/2004 | Riza | G02B 26/106 |
| | | | 359/204.1 |
| 2013/0208332 A1* | 8/2013 | Yu | H01Q 15/10 |
| | | | 977/73 |
| 2015/0166395 A1* | 6/2015 | Marjanovic | C03C 15/00 |
| | | | 428/131 |

* cited by examiner

*Primary Examiner* — David C Payne
(74) *Attorney, Agent, or Firm* — Kim and Lahey Law Firm, LLC; Douglas W. Kim

(57) ABSTRACT

This system and method of for providing a tunable orbital angular momentum system for providing higher order Bessel beams comprising: an acousto-optical deflector configured to receive an input beam, deflect a first portion of the input beam a first deflection angle relative to an axis of propagation and along an optical axis and deflect a second portion of the input beam a second deflection angle relative to the optical axis; a line generator disposed along the optical angle for receiving the first portion and the second portion of the input beam and provide an elliptical Gaussian mean; a log-polar optics assembly disposed along the optical angle for receiving the elliptical Gaussian beam and wrapping the elliptical Gaussian beam with an asymmetric ring; and, a Fourier lens configured to receive the wrapped elliptical Gaussian beam.

22 Claims, 11 Drawing Sheets

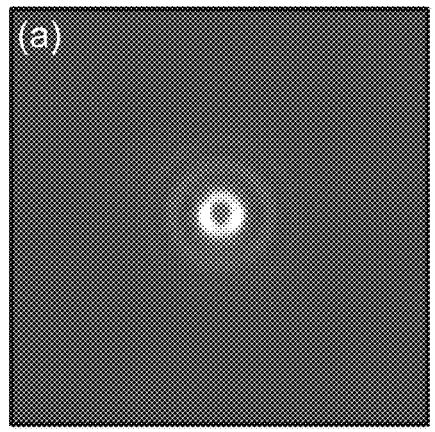
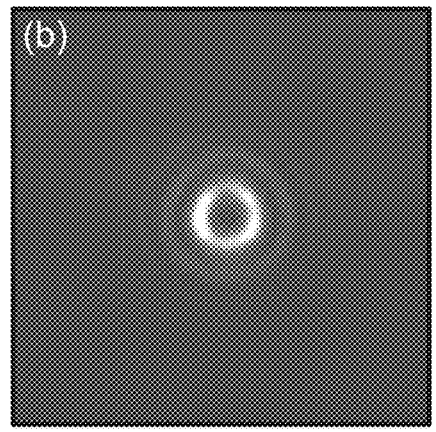
Fig. 14a  Fig. 14b
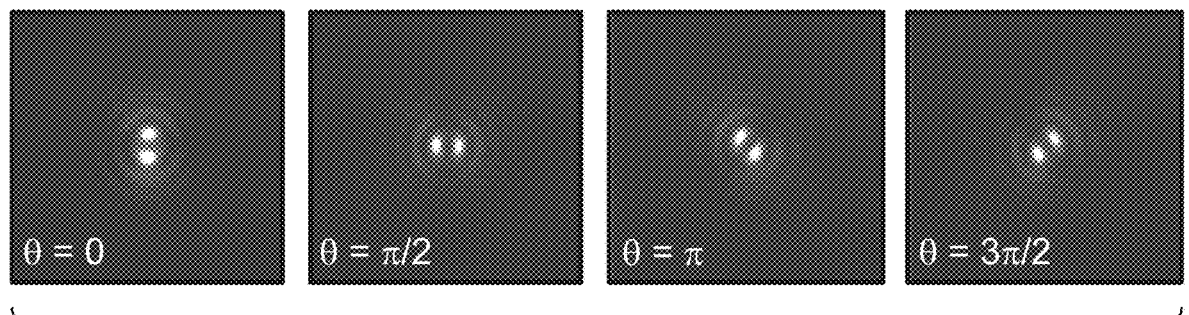
Fig. 15a
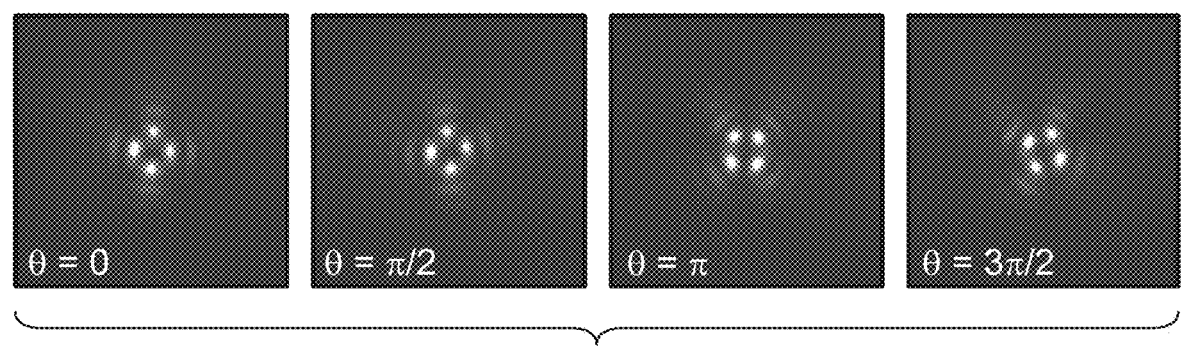
Fig. 15b

TUNABLE ORBITAL ANGULAR MOMENTUM SYSTEM

RELATED APPLICATIONS

This application is a continuation of U.S. patent application Ser. No. 16/725,293 filed Dec. 23, 2019 which claims priority on U.S. Provisional Patent Application 62/784,202 titled filed Dec. 21, 2018, all of which are incorporated by reference.

STATEMENTS REGARDING FEDERALLY SPONSORED RESEARCH

This invention was made with government support under Federal contracts N00014-16-1-3090 and N00014-17-1-2779 awarded by the Office of Naval Research. The government has certain rights in the invention.

BACKGROUND OF THE INVENTION

1) Field of the Invention

This system is a novel technique for generating higher order Bessel beams integrated in time.

2) Description of the Related Art

In modern computing, communications, data processing and information technologies, the calculations speed, processing times, storage capacity and speed for data retrieval continue to rapidly improve. However, such improvements are limited by physical restrictions such as how fast information can move from one place to another. Transmissions speeds are limited by the number bits of information that can be transmitted using a single photon in a light beam having an orbital angular momentum (OAM) that is not zero. Generally, the number of orthogonal states of the orbital angular momentum of a photon determines the number of bits that can be carried by the photon.

One technique for OAM mode switching uses spatial light modulators (SLM). However, this technique and device has a very limited switching speed resulting in disadvantages over the present system. While digital micro-mirror devices (DMD) can boost switching speeds up to tens of kHz, which is comparable with the switching speed of a direct OAM mode emitter, the DMD micro-mirror pitch limits the spatial resolution and is only acceptable for lower optical power applications. Further, the mode emitter is limited to only tuning integer OAM modes. Fractional OAM modes, also referred to as non-integer, continuous, successive, and rational modes are advantageous but not presently provided with DMD technologies.

It would also be beneficial if there were fractional OAM Bessel beams that could form any number of orthogonal subsets of OAM modes which could be advantageous for optical communications, including in-flight optical security applications. Further, fractional OAM Bessel beams can preserve the non-diffracting properties that integer OAM beams possess. This property is advantageous for beam propagation applications, including propagation through turbulence and turbid environments. In addition, fractional OAM modes generated by a synthesis of Laguerre-Gaussian (LG) modes can have advantageous structural stability on propagation to the far field. Previously, a long coherence length laser source was needed to ensure different OAM modes would interfere properly. However, disadvantages are present with long coherence length laser sources so that there is a need for the optical path length difference to be small between simultaneously generated beams with different OAM.

The growing interest in properties, including angular and polarized properties, of optical beams as new applications are being considered for this technology. The ability to quickly switch between OAM modes is advantageous to this effort and for new applications of this technology.

It is an object of the present system to provide for improvements in technologies including communication from classical to quantum applications, optical manipulation of particles, beam shaping, laser beam machining, microscopy, microlithography, direct energy, filamentation, as well as sensing through turbulence in air and underwater environments.

It is another object of the system to provide for the tunable capabilities of present system to improve optical transmissions in various conditions, including environments that change slowly such as turbulence.

It is an object of the present system to provide for a superposition of driving frequencies that result in multiple OAM modes being generated simultaneously.

It is an object of the present invention to provide for a system to improve communications (e.g. high bandwidths, high data rates, minimal absorption, bandwidth scalability, etc.) and seeks to increase the bandwidth of a communication system along with giving added security and encryption with the OAM charge numbers.

It is an object of the present invention to provide for a system to improve imaging as OAM topological charge numbers can propagate better in turbulent environments (e.g., underwater, turbid environments, etc.), especially when a tunable system can scan through the charge numbers to identify a desirable mode on a time scale faster than the changes in the environmental conditions.

BRIEF SUMMARY OF THE INVENTION

The above objectives are accomplished by providing an optical beam with fast and continuously-tunable orbital angular momentum and have potential applications in classical and quantum optical communications, sensing, and in the study of beam propagation through turbulence. This tunable orbital angular momentum system can generate optical beams using an AOD that can wrap elliptically-shaped Gaussian beams with linear phase tilt to provide a ring. The system can be used with an optical source that can be continuous wave and/or pulsed. The optical source can be encoded with information in terms of a time signal and can be composed of a single wavelength or multiple wavelengths. The system can transmit single or multiple coherent beams with different OAM topological charge numbers.

This system can include the use of an AOD in conjunction with log-polar transformation optics and provides for fast and continuous tuning of the orbital angular momentum (OAM) topological charge number of the output beams. The system generates beams with integer and fractional topological charge numbers. This system can include an acousto-optic deflector to add a linear phase ramp to an optical beam that can be wrapped into an azimuthal phase. The AOD in conjunction with the log-polar optics assembly results in a system that can be used at high power, with fast and continuous OAM mode tuning.

The system herein can provide for a fast-tunable OAM generation system and method that can utilizes an optical geometric transformation known as the log-polar transform.

The acousto-optical deflector (AOD) is a fast modulation device used for stable phase modulation and beam shaping. Bessel beams generated using an AOD array and a cylindrical axisymmetric AOD have been provided using this system. In this system, a novel technique for OAM switching and tuning using an AOD in conjunction with a log-polar coordinate transformation system is provided. In one configuration, the maximum mode switching speed for the experimental setup can be measured on the order of 400 kHz, which is determined by the acoustic velocity of the crystal as well as the beam diameter. For a different AOD and a reduced beam size, this speed can reach tens of MHz with sub-microsecond response time, a distinctive improvement over the prior art.

In one configuration, an RF signal is applied to the AOD to produce a traveling wave in a crystal. The frequency of the acoustic signal corresponds to the angle of the $1^{st}$ order diffraction relative to the $0^{th}$ order. The system is designed around this angle to produce specific OAM topological charge numbers. As the frequency of the applied signal is varied, the deflection angle of the $1^{st}$ order changes accordingly. Each frequency corresponds to a specific deflection angle and therefore, a unique OAM charge number. Since the frequency can be controlled with a continuous range, the generated OAM charge numbers can also be generated in a precise and continuous fashion.

In one configuration, the AOD can support a superposition of acoustic signals, producing multiple output beams with different OAM charge numbers. The different OAM modes leaving the system will then coherently interfere.

An AOD can be used to continuously tune the deflection angle of an output optical beam. Because the AOD has a high damage threshold, and can therefore be used in high power laser systems for beam deflecting and laser pulse generation, the integration of an AOD with log-polar transformation optics provides for high power and directed energy related applications not previously possible in the prior art.

The tunable orbital angular momentum system can include an acousto-optic deflector adapted to receive an input beam deflected along an optical axis when a voltage is applied to the acousto-optic deflector wherein the acousto-optic deflector outputs a first output beam having a first deflection beam and a second deflection beam wherein the first deflection beam is in a tilted phase relative to an axis of propagation; a line generator disposed along the optical axis adapted to receive the first output beam and provide a second output beam having an elliptical beam; and, a log-polar optics assembly disposed along the optical axis adapted to receive the second output beam and adapted to transform the second output beam into a third output beam having an asymmetric annular-distribution and to provide a fourth output linear phase wrapped into an asymmetric ring with azimuthal orbital angular momentum phase.

The input beam can include a flat wavefront. The log-polar optics assembly can be adapted to provide an elliptical Gaussian beam having an azimuthal orbital angular momentum phase. The second output beam can be an elliptical beam with an elongated length, a suppressed height and a phase tilt along a horizontal direction specific to an applied acoustic frequency. A Fourier lens can be included and adapted to receive the fourth output prior to the fourth output being provided. The log-polar optics assembly can include a first log-polar optic and a second log-polar optic cooperatively associated to map the second output beam to an asymmetric ring profile. The first log-polar optic and the second log-polar optic can be cooperatively associated to map the second output beam to a phase-corrector adapted to correct a phase distortion introduced by a wrapper. The input beam can be a Gaussian input.

The system can include a deflection angle defined by the first deflection beam and the second deflection beam that is continuously tunable by adjusting a frequency of an acoustic signal of the acousto-optic deflector. The system can include a first 4-f line generator adapted to image the first deflection beam into a line shape beam's linear phase and a second 4-f line generator adapted to elongate a circular input beam into the input beam. The line generator can be adapted to shape the first deflection beam and the second deflection beam of the input beam into an elliptical Gaussian beam using a first lens and a second lens. The acousto-optical deflector can be is adapted to add a linear phase gradient to the input beam. The line generator can be adapted to elongate the first deflection beam and the second deflection beam of the input beam into an elliptical Gaussian line.

The fourth output can be an optical beam carrying digital data. The fourth output can be a wrapped elliptical Gaussian beam adapted for secure digital communication. The fourth output can be a wrapped elliptical Gaussian beam adapted to manage spatial coherence of beams for structured light imaging. The acousto-optic deflector can include a crystal adapted as a Q-switch modulators in a solid state laser.

The log-polar optics assembly can be disposed along the optical axis and adapted to receive the second output beam and adapted to transform the second output beam into a third output beam having an asymmetric annular-distribution to provide a fourth output linear phase wrapped into an asymmetric ring with azimuthal orbital angular momentum phase wherein the fourth output includes multiple modes. The multiple modes can be provided by applying a superposition of multiple RF frequencies. The multiple modes can include factional modes.

This system can alco include a log-polar optics assembly adapted to receive an input beam having an orbital angular momentum and provide a first output beam; an acousto-optic deflector adapted to receive the first output beam and scan through a frequency range and detect charge numbers associated with the input beam; and, a fiber coupled detector adapted for receiving the first output beam and determining the orbital angular momentum modes. The system can include a first telescope adapted to receive the input beam prior to the input beam being received by the log-polar optics assembly and a second telescope adapted to receive an output beam from the log-polar optics assembly and project the output beam to the acousto-optic deflector.

BRIEF DESCRIPTION OF THE SEVERAL VIEWS OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein:

FIGS. 14A and 14B are illustrations of aspects and results of the system; and,

FIGS. 15A and 15B are illustrations of aspects and results of the system;

DETAILED DESCRIPTION OF THE INVENTION

To improve speeds of information transmission and communications, at this invention has the capability of switching or hopping between OAM modes can significantly increase data transmissions rates. Such technical improvements in computer functionality can provide for the increased efficiency in computer system and information system as a whole. Further, when using the OAM beams provided for by the present invention, switching between different OAM modes can provide for different propagation performances through turbulence environment thereby improving transition rates. The fast switching between OAM modes can provide for the ability to investigate a wide range of OAM modes. Further, sensing applications can benefit from rapidly tunable OAM that includes beam steering through a scattering media, particle manipulation using three dimensional beams, object rotation detection, temperature sensing, and motion detection. Therefore, transmission of data can be improved and customized to the environment dynamically.

Figure 1:
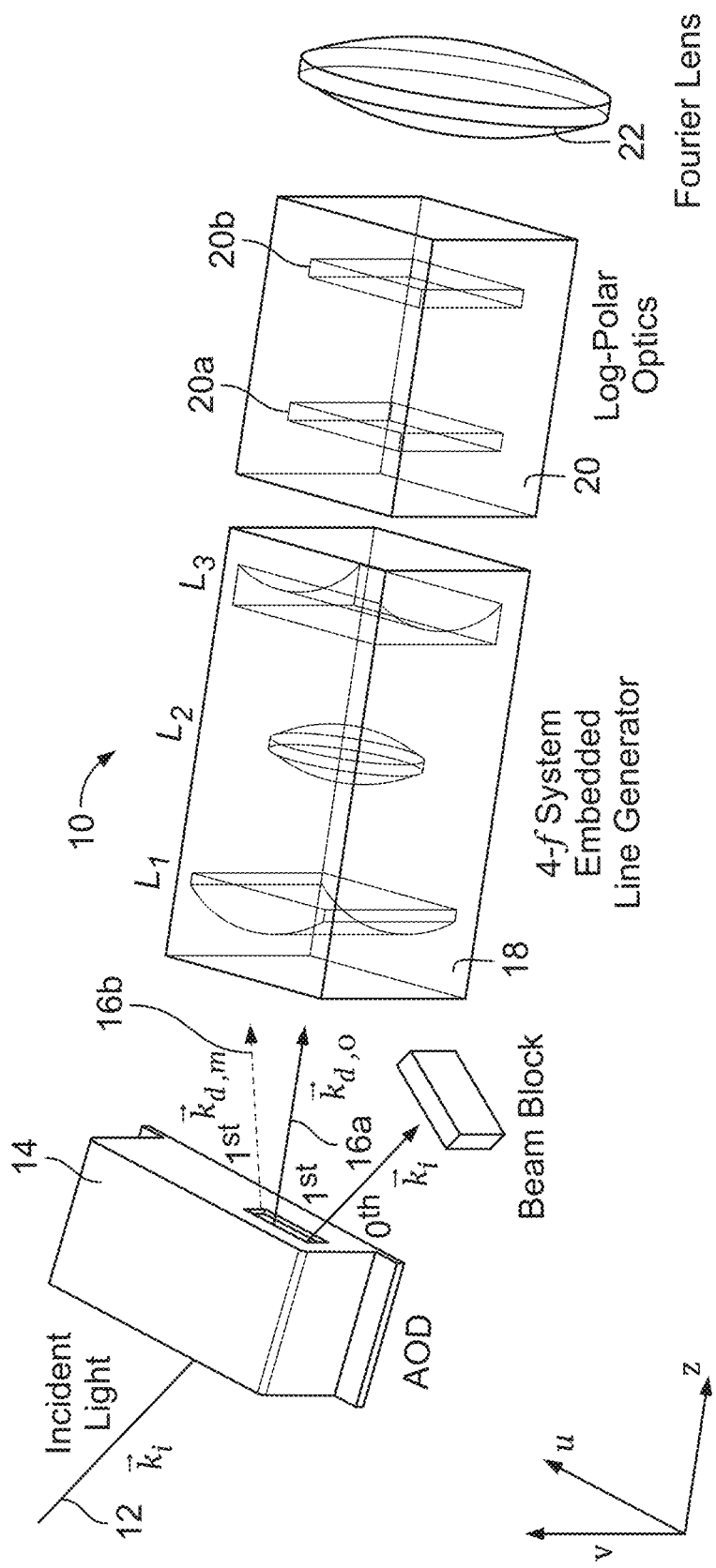
FIG. 1 is a schematic of aspects of the system.

With reference to the drawings, the invention will now be described in more detail. Referring to FIG. 1, an optical configuration 10 used to generate OAM modes is shown. In this technique, an input beam 12, Gaussian or otherwise, is passed through an acousto-optic deflector ("AOD") 14. When a voltage signal with the central frequency of the AOD is applied, the $1^{st}$ order deflection of the Gaussian input is at the Bragg condition with the Gaussian beam propagating along the optical axis. In this orientation, the Gaussian beam can have a flat wavefront and the designed system will generate an OAM mode of charge equal to zero, 16a. When the frequency of the acoustic wave deviates from this center frequency, the beam is instead deflected by some additional angle 16b along the horizontal direction. The deviation away from the Bragg condition results in the $1^{st}$ order deflection with a tilted phase relative to the axis of propagation. The output of the AOD is then passed through a line generator 18, used as a dual-axis manipulator. The output of the line generator can include an elliptical beam with an elongated length and a suppressed height with a phase tilt along the horizontal direction specific to the applied acoustic frequency. The line generator can be an f-type in one embodiment. This elliptical beam then propagates through log-polar optics assembly 20 that wrap the ellipse into an asymmetric annular-distribution. The beam can then pass through a Fourier lens 22. Overall, this results in an elliptical Gaussian beam with linear phase being wrapped into an asymmetric ring with azimuthal OAM phase.

Figure 2:
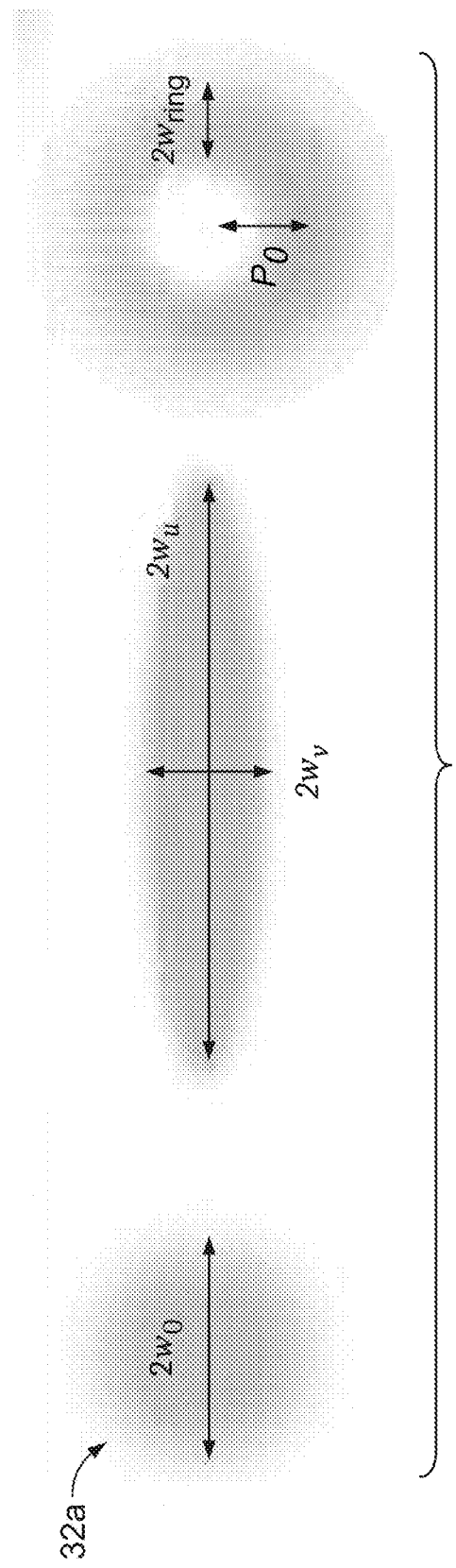
FIG. 2 is a diagram of aspects of the system.
Figure 3:
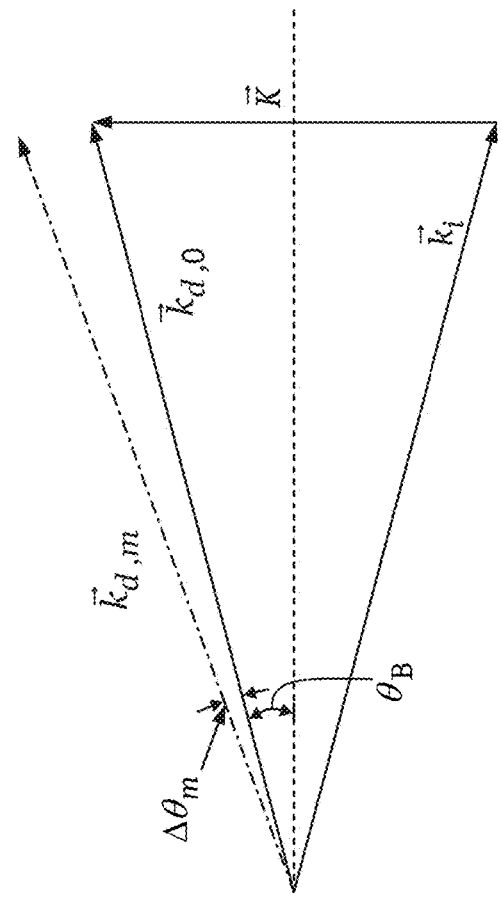
FIG. 3 is a diagram of aspects of the system.

Referring to FIG. 2, the input into the AOD can have a Gaussian distribution with the diameter of the beam defined as $2_{w_0}$ as shown by 32a. The momentum vector of incident photon can be $\vec{k_i}$, that of the diffracted photon can be $\vec{k_d}$, and that of the photon can be $\vec{K}$. According to the principle of momentum conservation, the momentum vector of the diffracted photon should be equal to the sum of the momentum vectors of the incident photon and of the acoustic phonon $\vec{k_d}=\vec{k_i}+\vec{K}$, as shown in FIG. 3. The notation $\vec{k_{d,0}}$ and $\vec{k_{d,m}}$ is used for the diffracted photon's momentum vector when the far-field beam has charge 0 and m, respectively. The OAM mode index m=I+α is a continuous charge number in which I is the integer part and α is the fractional part, which is defined as a positive real number 0≤α<1. The Bragg angle in FIG. 1 can be represented as $$\theta_B \cong \sin\theta_B = \frac{|\vec{K}|}{2|\vec{k_i}|} = \frac{\lambda_0 f_0}{2V_a}, \qquad (1)$$

where $\lambda_0$ is the electromagnetic wave Doppler shifted wavelengths corresponding to the OAM charge 0, $V_a$ is the acoustic velocity and $f_0$ is the driving frequency of the AOD that results in the Bragg condition, and can also be the frequency corresponding with charge 0 output. The $1^{st}$ order diffractive angle can be $2\theta_B$. By deviating the applied frequency away from the Bragg condition, $\Delta f_m=|f_0-f_m|$, where $f_m$ is the AOD driving frequencies corresponding with charge m output, there is a change in the deflection angle of the beam for charge m as $$\Delta\theta_m = |\theta_m - \theta_0| = \left|\frac{\lambda_m \cdot f_m}{V_a} - \frac{\lambda_0 \cdot f_0}{V_a}\right| \approx \frac{\lambda_m \cdot |f_m - f_0|}{V_a} = \frac{\lambda_m \cdot \Delta f_m}{V_a}, \qquad (2)$$

where $\lambda_m$ is the electromagnetic wave Doppler shifted wavelengths corresponding to the OAM charge m. Since these wavelengths are extremely close with each other, differing by femtometers for a 532 nm input signal, we can assume $\lambda_m \approx \lambda_0$. The angle deviation after the line generator, $\Delta\theta'_m$, will be scaled by the magnification of the $1^{st}$ 4-f system according to $$\Delta\theta' = \Delta\theta_m \frac{F_1}{F_2}, \qquad (3)$$

where $F_1$ and $F_2$ are the focal lengths of the lenses $L_1$ and $FL_1$, respectively, in FIG. 1. According to the paraxial approximation, this angle deviation corresponds to charge m and can be represented by $$\Delta\theta'_m \approx \tan(\Delta\theta'_m) = \frac{\lambda_m m}{2\pi a}, \qquad (4)$$

where α is the log-polar optics design parameter that scales the transformed line length in the unwrapping procedure.

Combining Eq. (2)-(4) results in an expression for charge in as a function of the frequency change from the Bragg condition given by $$m = \frac{2\pi a(\Delta f_m) F_1}{V_a F_2}. \quad (5)$$

As shown in FIG. 1, the $1^{st}$ order deflected beam exiting the AOD is a Gaussian distribution, which can be expressed as $$U_{AOD_{1st}}(u, v) = \exp\left[-\frac{(u^2+v^2)}{w_o^2}\right]\exp\left[i\left(2\pi(f_c+f_m)t - \overrightarrow{k_{d.m}} \cdot \vec{r}\right)\right] = \quad (6)$$

$$\exp\left[-\frac{(u^2+v^2)}{w_o^2}\right]\exp[i2\pi(f_c+f_m)t - k_z z - k_u u].$$

where u and v are both Cartesian coordinates, $f_c$ is the input laser's central frequency, $k_z = 2\pi \cos(\Delta\theta_m)/\lambda_m$ and $k_u = 2\pi \sin(\Delta\theta_m)/\lambda_m \approx 2\pi\Delta\theta_m/\lambda_m$ are the wavenumbers along the z and u direction, and finally $(f_c+f_m)$ and $\lambda_m$ are the electromagnetic wave Doppler shifted frequency and wavelength corresponding to the OAM charge m. After passing through the AOD 14 (FIG. 1), the beam is sent to the line generator to be shaped into an elliptical Gaussian distribution using lenses $L_1$, $L_2$ and $L_3$ with focal lengths $F_1$, $F_2$ and $F_3$, respectively. The elliptical Gaussian beam now has diameters in both dimensions, defined as $2w_v = 2w_o F_3/F_2$ and $2w_u = 2w_o F_2/F_1$. The elliptical beam can be expressed as $$U_{line}(u, v) = \exp\left[-\left(\frac{u^2}{w_u^2} + \frac{v^2}{w_v^2}\right)\right]\exp[i(2\pi(f_c+f_m)t - k_z' z - k_u' u)], \quad (7)$$

where the wavenumber along z direction is $k_z' = 2\pi \cos(\Delta\theta_m')/\lambda_m = 2\pi \cos(\Delta\theta_m F_1/F_2)/\lambda_m$, and the wavenumber along u direction is $k_u' = 2\pi\Delta\theta_m'/\lambda_m = m/a$.

The elliptical Gaussian beam is then incident on the log-polar optics. The system uses a mapping process that uses two log-polar optics: the wrapper that maps the elliptical Gaussian beam to an asymmetric ring profile, and the phase-corrector that corrects the phase distortion introduced by the wrapper. Since the elliptical line has a horizontal Gaussian distribution, the system wraps it into an asymmetric ring with a ring radius, $\rho_0$, defined from the origin to peak intensity location and width, $2w_{ring}$, as shown in FIG. 3. Given the log-polar mapping equation of $u = a \arctan(y/x) = a\phi$, the near-field output from the system is given by $$U_{near}(\rho, \phi) = \quad (8)$$

$$\exp\left[-\left(\frac{(\rho-\rho_0)^2}{w_{ring}^2} + \frac{\phi^2}{(\beta\pi)^2}\right)\right]\exp[i(-m\phi + 2\pi(f_c+f_m)t - k_z' z)],$$

where $\rho$ and $\phi$ are both the radial and azimuthal polar coordinates in the near-field plane, $\rho_0 = b \exp(-v_0/a)$ is the wrapped ring's radius defined from the origin to peak intensity location, $w_{ring} = \rho_0 \sinh(w_v/a)$ is the wrapped ring's half width $v_0$, is the input elliptical Gaussian beam's offset from the center of the wrapper, $w_v = w_0 F_3/F_2$ is the half width of the input elliptical Gaussian beam, a is the log-polar optics design parameter which scales the transformed line length in unwrapping procedure, b is another log-polar optics design parameter which scales the transformed ring size in the wrapping procedure, and $\beta = w_0 F_2/(\pi a F_1)$ is the ratio of input elliptical Gaussian line's length to the designed input line length $2\pi a$. The Fourier transform of Eq. (8) can then be derived as $$U_{far}(r, \theta) = \quad (9)$$

$$A\exp\left(-\frac{r^2}{w_G^2}\right)\exp[i(2\pi(f_c+f_m)t - k_z' z)]\sum_{n=-\infty}^{\infty} B_n \exp(in\theta) J_n\left(\frac{2\pi\rho_0}{\lambda_m F}r\right),$$

where r and θ are the radial and azimuthal polar coordinates in the far field plane, $A = w_{ring}^2 \beta \pi^{5/2} \rho_0/(2\lambda_0 F)$, $w_G = \lambda_m F/(\pi w_{ring})$, F is the focal length of the Fourier lens, $B_n = (-i)^{n-1} 2 \exp[-\beta^2\pi^2(1+\alpha-n)^2/4] \operatorname{Im}[\operatorname{erfi}(i/\beta + \beta\pi(1+\alpha-n)/2)]$, $\operatorname{erfi}(x) = \operatorname{erf}(ix)/i$ is the imaginary error function, and finally $\operatorname{Im}(z)$ gives the imaginary part of complex number z. The far-field of the ring-shaped beam in Eq. (9) is the combination of a group of Bessel-Gaussian (BG) beams carrying OAM. It can be a weighted linear combination of integer OAM phase carrying nth-order Bessel function of the $1^{st}$ kind modulated by the same Gaussian envelope. The parameter $B_n$ is the weighting or selection factor, which distributes the power within the central 2 to 3 modes and decays rapidly as in approaches positive and negative infinity. When α=0, then m=l, meaning an integer charge will be select as n=l, and $B_l$ is the maximum value. As a increases, the central weighting factor $B_n$'s maximum value will move from n=l to n=l+1. This means fractional-charged OAM-carrying BG beams are a linear combination of integer BG beams. Considering the α=0 case, the $B_n$ parameter has the property of $$B_{m-k} = (-1)^k B_{m+k}, k=0,1,2,\ldots \quad (10)$$

The far-field complex amplitude described by Eq. (9) can be rewritten as $$U_{far}(r, \theta) = \quad (11)$$

$$A\exp\left(-\frac{r^2}{w_G^2}\right)\exp[i(m\theta + 2\pi(f_m+f_c)t - k_z' z)] \cdot \left\{B_m J_m\left(\frac{2\pi\rho_0 r}{\lambda_m F}\right) + i\sin\theta\right.$$

$$\frac{m\lambda_m F}{\pi\rho_0 r} B_{m+1} J_m\left(\frac{2\pi\rho_0 r}{\lambda_m F}\right) + \cos\theta B_{m+1}\left[J_{m+1}\left(\frac{2\pi\rho_0 r}{\lambda_m F}\right) - J_{m-1}\left(\frac{2\pi\rho_0 r}{\lambda_m F}\right)\right] +$$

$$\sum_{k=1}^{\infty} \left\{B_{m+2k+1}\left\{\cos((2k+1)\theta)\left[J_{m+2k+1}\left(\frac{2\pi\rho_0 r}{\lambda_m F}\right) - J_{m-2k-1}\left(\frac{2\pi\rho_0 r}{\lambda_m F}\right)\right] + \right.\right.$$

$$i\sin((2k+1)\theta)\left[J_{m+2k+1}\left(\frac{2\pi\rho_0 r}{\lambda_m F}\right) + J_{m-2k-1}\left(\frac{2\pi\rho_0 r}{\lambda_m F}\right)\right]\right\} +$$

$$B_{m+2k}\left\{\cos(2k\theta)\left[J_{m+2k}\left(\frac{2\pi\rho_0 r}{\lambda_m F}\right) + J_{m-2k}\left(\frac{2\pi\rho_0 r}{\lambda_m F}\right)\right] +$$

$$\left.\left.i\sin(2k\theta)\left[J_{m+2k}\left(\frac{2\pi\rho_0 r}{\lambda_m F}\right) - J_{m-2k}\left(\frac{2\pi\rho_0 r}{\lambda_m F}\right)\right]\right\}\right\}\right\}$$

This indicates that these beams are comprised of only one integer OAM phase $\exp(im\theta)$, and the Bessel term of $B_m J_m(2\pi\rho_0 r/\lambda_m F)$ dominates, since $B_m$ is the maximum of $B_n$. The standing wave terms $\sin\theta \cdot m\lambda_m F B_{m+1} J_m(2\pi\rho_0 r/\lambda_m F)/\pi\rho_0 r$ and $\cos\theta \cdot B_{m+1}[J_{m+1}(2\pi\rho_0 r/\lambda_m F) - J_{m-1}(2\pi\rho_0 r/\lambda_m F)]$ contribute to the asymmetric intensity of this group of BG beams. In fact, the rest of the $B_n$ factors are really small in comparison with the central term and contribute minimally to the BG beam, but still in the form of standing waves.

As can be seen in Eq. (11), a change in β only affects the weighting factor $B_n$. Conceptually, when μ is very small, very little power will be contained at the edges of the active zone on the log polar elements. When this whole area is wrapped, there will be a highly asymmetric ring. As β approaches 1, the distribution about the wrapped ring becomes more azimuthally Gaussian. In fact, as β increases beyond 1, the distribution about the wrapped ring becomes more azimuthally uniform and the weighting factors $B_{l\pm1}$ decrease, but more of the power will be clipped by the log-polar optic aperture. This results in a lower power efficiency of the system but higher modal symmetry. Eq. (9) not only describes the distribution of integer charge numbers, but also fractional charge numbers.

Figure 4:
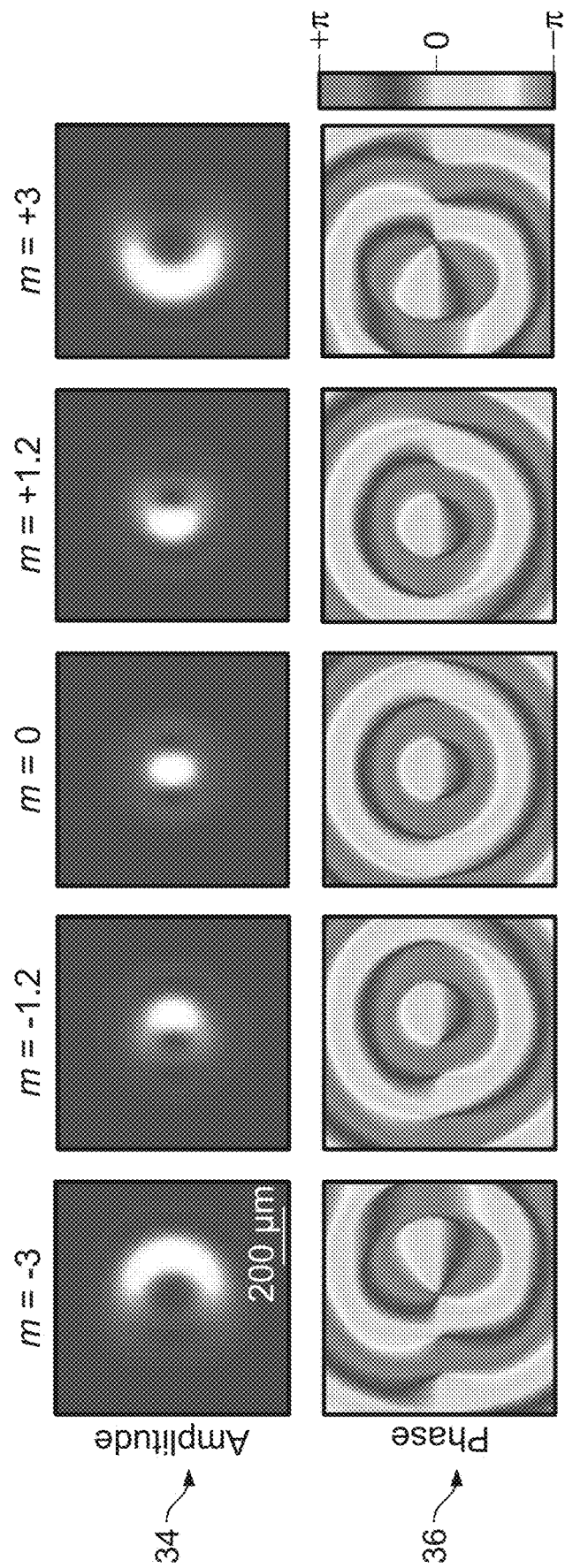
FIG. 4 is an illustration of aspects and results of the system.

Referring to FIG. 4, analytic intensity and phase profiles using simulation parameters λ=532 nm, β=0.66, $w_{ring}$=329 μm, $ρ_0$=850 μm, using 5 central terms, and for the focal length of Fourier lens F=400 mm is shown. Amplitude is shown as 34 with phase shown as 36. Traditionally, the log-polar coordinate transform theory assumes that the input is a rectangular shaped beam. This input results in a reduced translation efficiency due to the fact that a Fourier transform of a rectangular function contains high spatial frequency components. Further, a Gaussian shape produces a Gaussian distribution. In the present system, however, an elliptical Gaussian beam can be generated from a Gaussian input resulting in a higher power efficiency compared to that of a rectangular beam input traditionally used.

Figure 5:
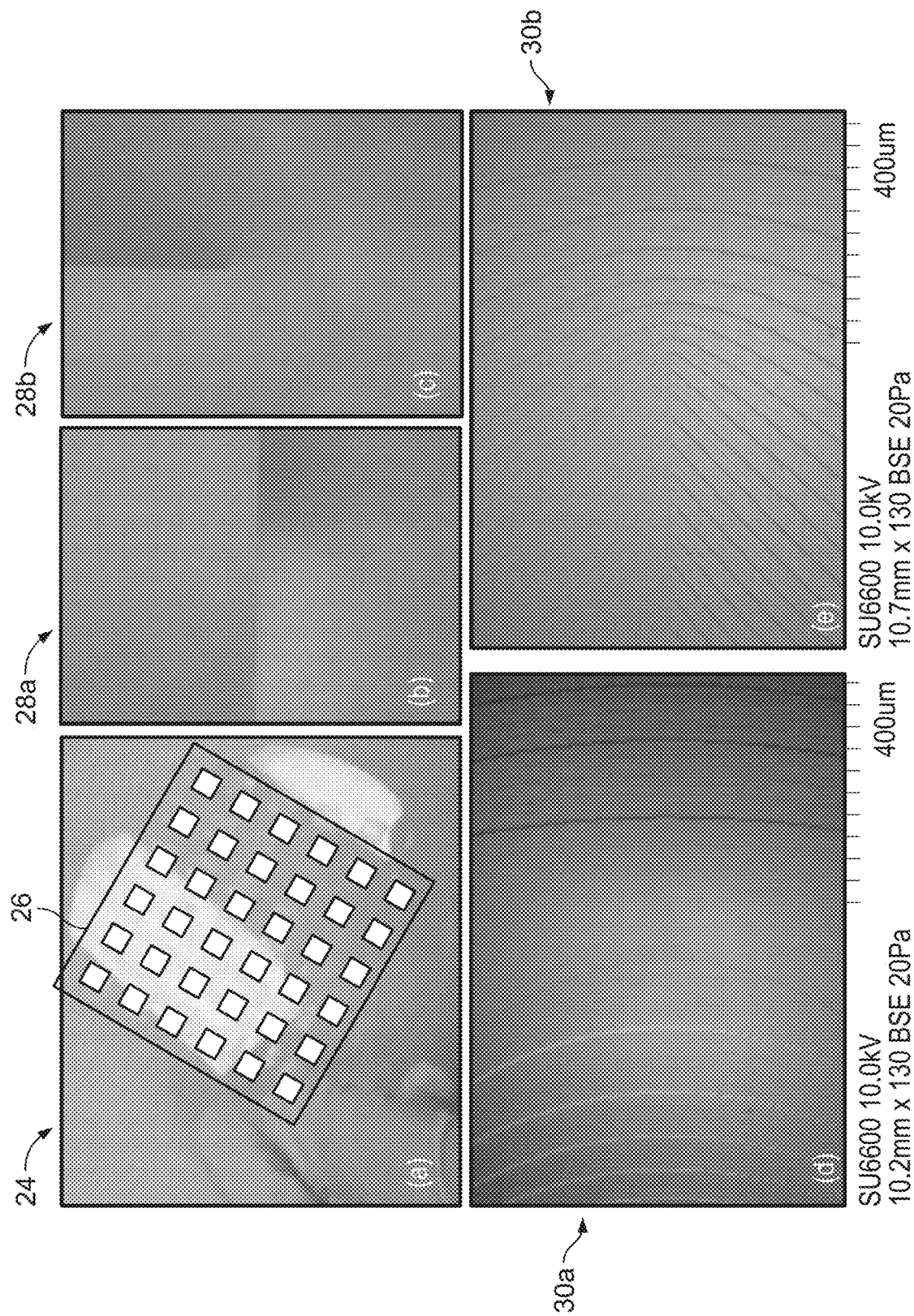
FIG. 5 shows illustrations of aspects and results of the system.

In order to produce the log-polar optics assembly 20 (FIG. 1), the diffractive elements 20a and 20b can be fabricated using a photolithographic method. Referring to FIG. 5, one configuration can be made by fabricating a 6 row×6 column device 24 on a single wafer 26. In one configuration, the optics can be optimized for the wavelength of 532 nm, and have a pixel size of 2 μm×2 μm and $2^4$=16 phase levels. The design parameter a can be 1.8/π mm and b can be 2 mm. The microscope profiles of a wrapper and phase-corrector are shown as 28a and 28b. Scanning-electron microscopy (SEM) images of the fabricated optics are shown as 30a and 30b with magnification of 130 times. The diffraction efficiency of a 4-layer lithographic process diffractive phase element can be about 98%. A 99.9% transmission anti-reflection (AR) coating can be applied on each surface of the log-polar optics that can result in the mean transmission efficiency of both the wrapper and phase corrector combined of about 91% with 0.5% standard deviation from charge −10 to 10.

Figure 6:
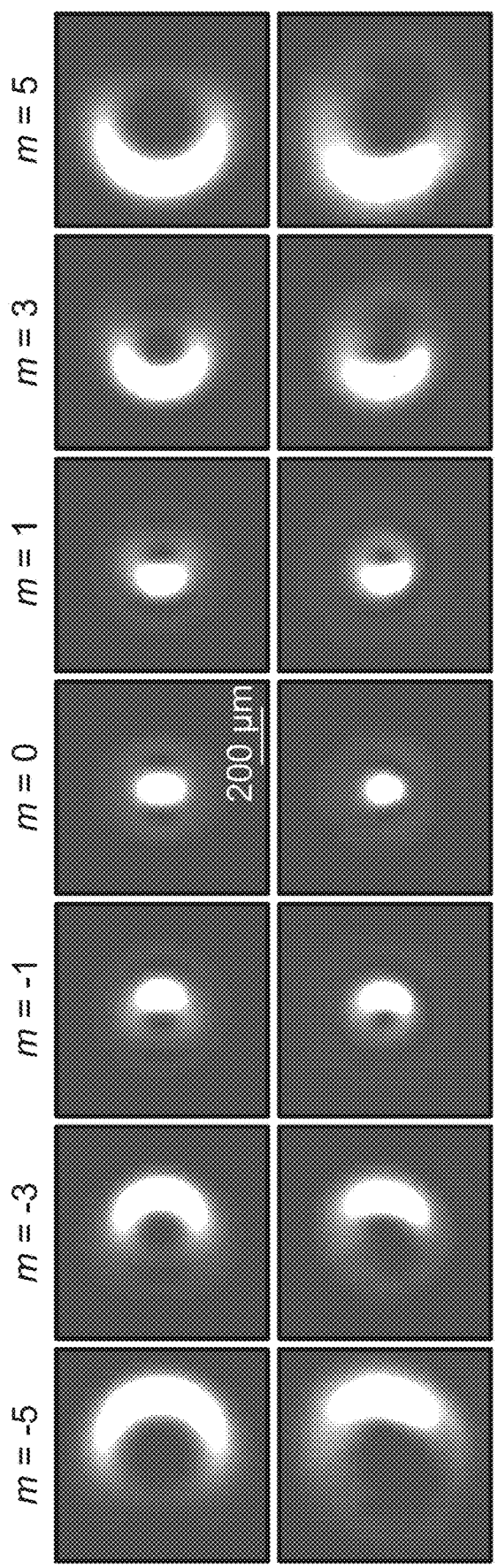
FIG. 6 shows illustrations of aspects and results of the system.

In one embodiment, the AOD that can couple up to 70% of the optical energy into its $1^{st}$ diffraction order. This deflection angle is continuously tunable by adjusting the frequency of the acoustic signal. The system can apply a 4-f system to image the AOD output deflection angle into the line shape beam's linear phase and another 4-f system to elongate the circular Gaussian beam into an elliptical Gaussian beam. The elliptical Gaussian beam can be incident upon the wrapper and then can be mapped into an azimuthally asymmetric ring shaped beam during propagation to the phase corrector. After phase correction at the second optical element, the ring-shaped beam carrying OAM phase will form a BG beam in the far-field. One configuration is shown in FIG. 6. The AOD 14 is shown receiving incident light which is then transmitted to a line generator, such as the 4-f line generator 15a in this configuration and on to the log-polar optics 20.

In one configuration, the deflected beam can be generated using a Gooch & Housego AODF 4120-3. This AOD is constructed using a tellurium dioxide ($TeO_2$) crystal, with a Bragg angle of 2.9°, computed by Eq. (1). The input 36 having two deflections, passes through the line generator 18 and log polar optics 20 to produce an output beam 38.

In this configuration, the acoustic velocity is 0.65 mm/μs, which can be typical for the shear mode of a $TeO_2$ crystal. An input beam with a diameter of approximately 1.5 mm can be deflected at a rate of approximately 434.8 kHz, corresponding to a measured switching speed of 2.3 μs. Higher switching speeds can be achievable by using other materials such as quartz and fused silica. The acoustic velocity of such devices can be an order of magnitude above the shear-mode $TeO_2$ devices. By decreasing the beam size through a crystal and with a faster acoustic velocity, switching speeds could be further increased into the tens of megahertz. The transmission efficiency of each surface of the 3 optics in the line generator can be 99%, and the total transmission efficiency of log-polar optics assembly can be 91%. In one configuration, the $1^{st}$ order diffractive efficiency (DE) of the AOD can be 70% so that the total system efficiency is about 60%. Using a 30 mW input power, the output BG beam is about 18 mW.

Figure 7:
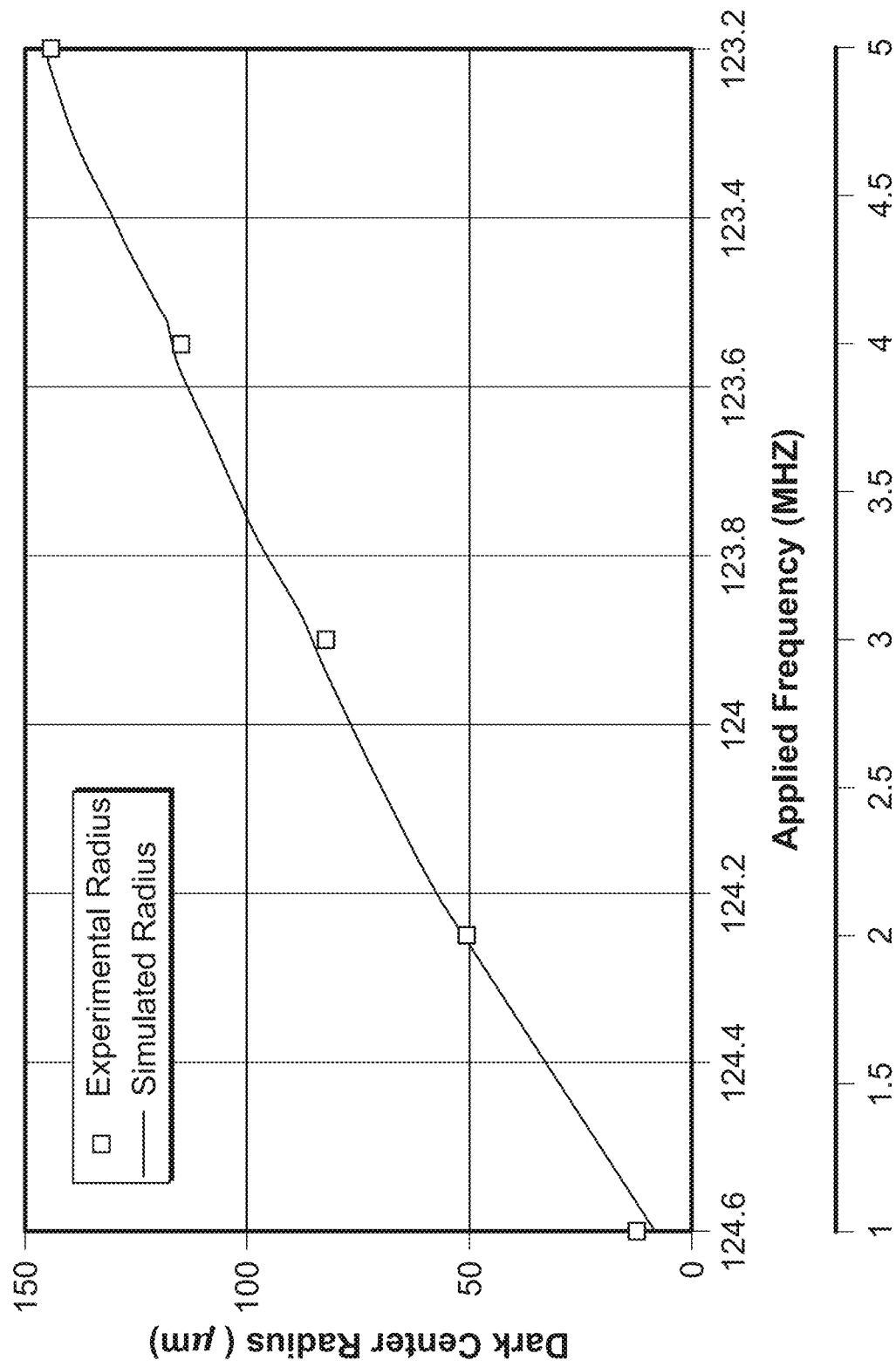
FIG. 7 shows illustrations of aspects and results of the system.

In one configuration, the focal lengths $L_1$ and $L_2$ are $F_1$=50 mm and $F_2$=100 mm respectively, parameter a=1.8/π mm, and the frequency index corresponding to Δm=1 interval is $Δf_1$=0.36 MHz. A series of rings with different OAM phases are output from the log-polar optics assembly. The far-field of this group of ring shape OAM phase carrying beams are BG beams. The generated BG beams are shown in FIG. 6. Referring to FIG. 7, a comparison of the radius of the dark vortex to the corresponding charge numbers as well as driving signal frequencies is shown for both the experimental and simulated beam profiles. This radius was measured by finding the inner radial location of the half-maximum amplitude. The DE of the m=−5 beam is 8.8% lower than the DE of the m=5 beam because the deviation away from the Bragg condition that has the highest DE. The simulated and experiment results of BG beams central dark area's radius vary with charge number as well as AOD driving signal's frequency.

Figure 8:
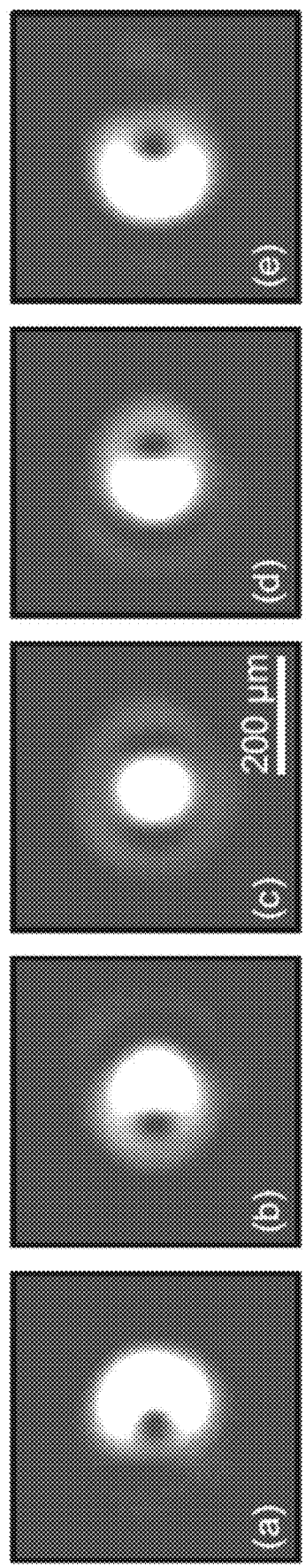
FIG. 8 shows illustrations of aspects and results of the system.

The deflection angle of the $1^{st}$ order AOD output is continuously tunable as well as the OAM phase. A sample of fractional OAM modes spanning from charge −1.2 to +1.2 in steps of 0.6 is shown in FIG. 8. Referring to FIG. 8, generated fractional OAM BG beams as shown as (a) charge −1.2, (b) charge −0.6, (c) charge 0, (d) charge 0.6, and (e) charge 1.2.

This system and method provide for cascading an AOD with log-polar optics assembly providing for transformation of an optical system to rapidly and continuously tune the output OAM mode of a BG beam. This system has the capability of generating tunable fractional OAM modes. The OAM mode can be controlled through the AOD driving frequency, which can control the amount of linear tilt to be wrapped into a ring through the log-polar transformation.

In one configuration, charge number scans can be defined by an arbitrary waveform across the acousto-optic deflector. The acousto-optic deflector can also be high efficiency and can be configured to withstand high powers with modulation rates 20× over LC spatial light modulators.

The scalar form of the far-field system described herein has results in a group of asymmetric fractional BG beams. This system provides for a fast and continuous OAM carrying BG beam tuning solution.

Figure 9:
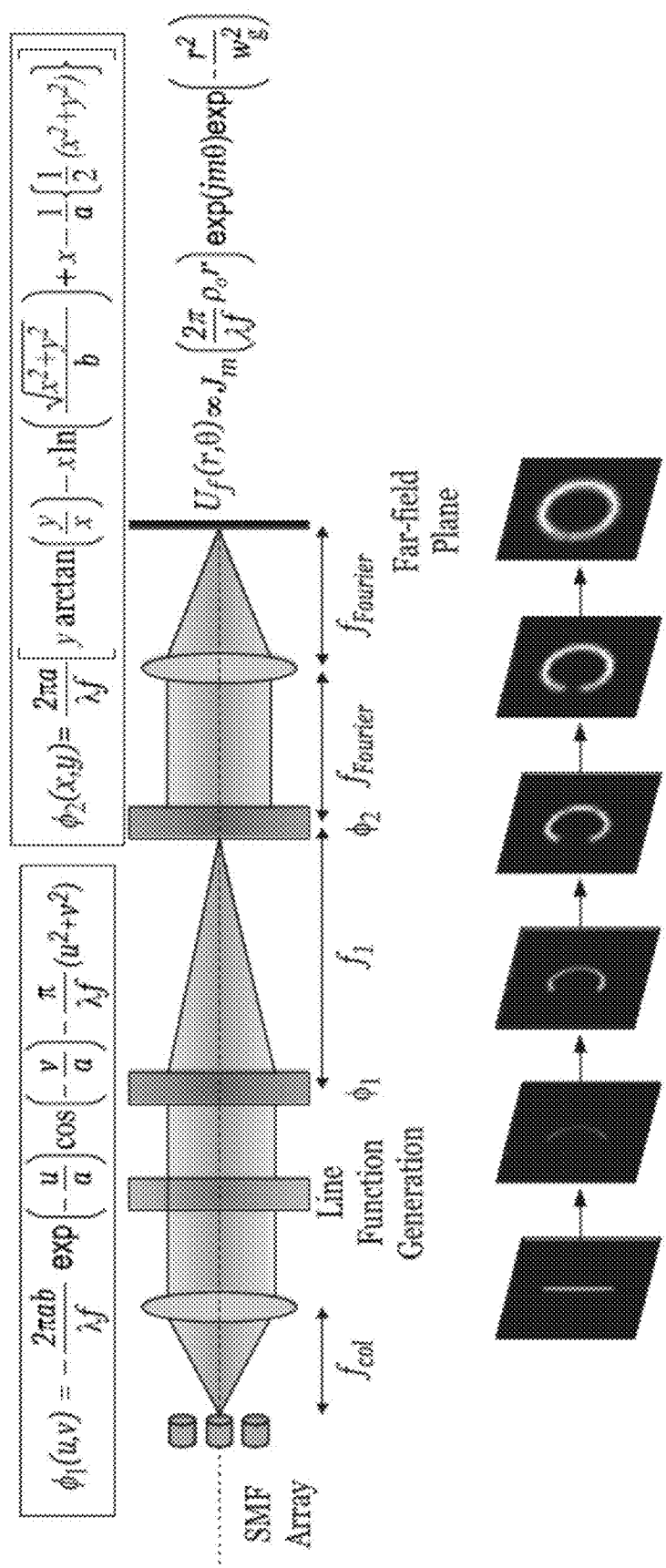
FIG. 9 is a schematic of aspects of the system.

Referring to FIG. 9, one configuration is shown for spatial multiplexing using the system described herein. The charge number can be related to the fiber input port on the input plane. Further, OAMs can be created from any two input port locations. The charge number can be fixed by fiber spacing on the input array and focal length of the lends in the present design.

Figure 10:
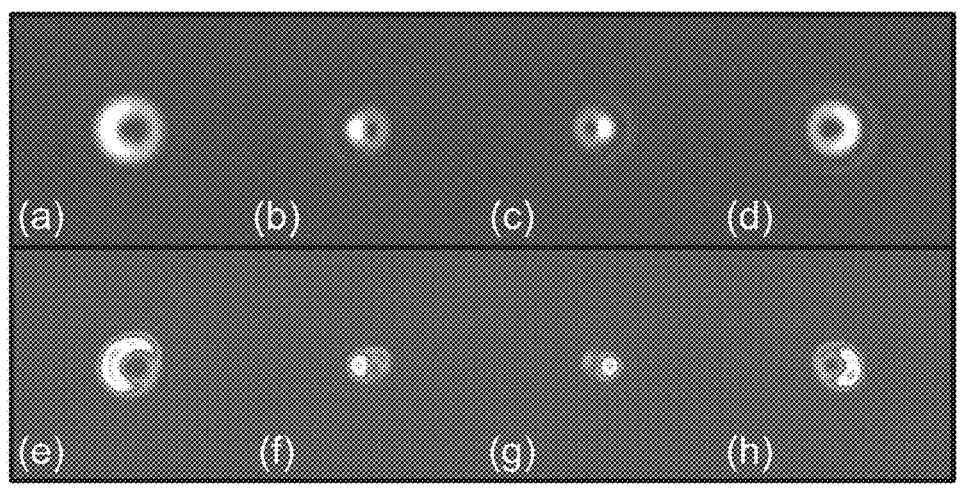
FIG. 10 is an illustration of aspects and results of the system.

Referring to FIG. 10, results for the present system with a 1550 nm spectrum with simulated results shown as (a) channel 1, m=2.0; (b) channel 2, m=0.7; (c) channel 3, m=−0.7; and (d) channel 4, m=−2.0 and the corresponding results shown as (e) to (h). The system herein also provides for a linear phase tilt (which can be the same as shifting the point source above and below the optic axis). A phase tilt can be introduced at the input plane to the system.

Figure 11A:
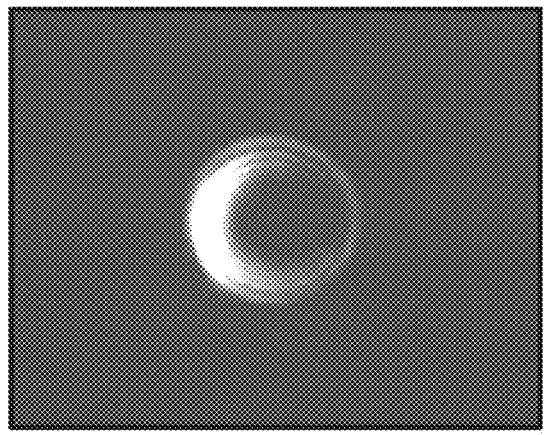
FIG. 11A is an illustration of aspects and results of the system.
Figure 11B:
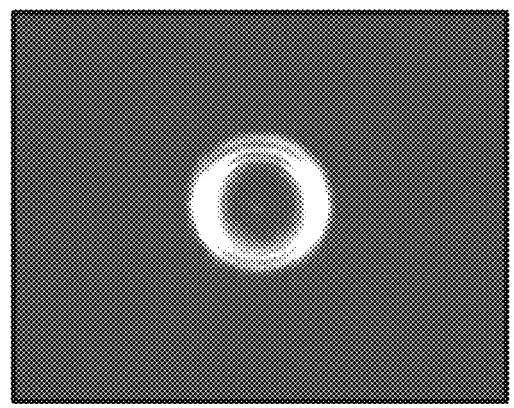
FIG. 11B is an illustration of aspects and results of the system.

Referring to FIG. 11A, shows a single charge number continuous scanning +5 to −5. A coherent combination of conjugate pairs continuous scanning +/−5 to 0 is shown in FIG. 11B.

The benefits of the current system can include that OAM can be used for underwater communications and the implementation of coherent multiplexing between OAM states has many applications in maritime sensing. The coherent coupling of OAM modes provides for a modulation scheme that can exploit higher order Poincare sphere for 3D and possibly 4D Codes. The beams provided by the system described herein can be realized with a combination of optics, amplitude and phase control for communications, sensing and directed energy. Quantum communication and sensing can be improved by using the beams and beam control provided by this system.

Numeric representations of the system described herein is provided below. The near-field output from the system represented by Eq. (8) can be rewritten as separable functions with respect to only $\rho$ or $\phi$ terms, $$U_{near}(\rho, \theta) = P(\rho)\Phi(\phi). \tag{12}$$

$$P(\rho) = \exp\left(-\frac{(\rho - \rho_0)^2}{w_{ring}^2}\right), \tag{13}$$

$$\Phi(\phi) = \exp\left[-\frac{\phi^2}{(\beta\pi)^2}\right]\exp(im\phi). \tag{14}$$

Since the far field light distribution is the Fourier transform of the near-field, then $$U_{far}(r, \theta) = \frac{1}{i\lambda_0 F}\mathcal{F}\{U_{near}(\rho, \phi)\} = \tag{15}$$

$$\frac{1}{i\lambda_0 F}\mathcal{F}\left\{\exp\left(-\frac{\rho^2}{w_{ring}^2}\right)\right\} \cdot \mathcal{F}\left\{\delta(\rho - \rho_0)\exp\left[-\frac{\phi^2}{(\beta\pi)^2}\right]\exp(im\phi)\right\}.$$

As shown in Eq. (15), there are two Fourier transforms that can be solved. Starting with the definition of the polar coordinate Fourier transform, $$U_{far}(r, \theta) = \frac{1}{i\lambda_0 F}\int_{-\pi}^{\pi}\int_0^{\infty} U_{near}(\rho, \phi)\exp\left(-i\frac{2\pi}{\lambda_m F}\rho r\cos(\theta - \phi)\right)\rho d\rho d\phi, \tag{16}$$

the term $\mathcal{F}$ of in Eq. (15) can be written as, $$\mathcal{F}\left\{\delta(\rho - \rho_0)\exp\left\{-\frac{\phi^2}{(\beta\pi)^2}\right\}\exp(im\phi)\right\} = \tag{17}$$

$$\int_{-\pi}^{\pi}\int_0^{\infty}\delta(\rho - \rho_0)\exp\left[-\frac{\phi^2}{(\beta\pi)^2}\right]\exp(im\phi)$$

$$\exp\left(-i\frac{2\pi}{\lambda_m F}\rho r\cos(\theta - \phi)\right)\rho d\rho d\phi.$$

Eq. 17 can be expanded into $$\exp\left(-i\frac{2\pi}{\lambda_m F}\rho r\cos(\theta - \phi)\right) = \sum_{n=-\infty}^{+\infty}(-1)^n J_n\left(\frac{2\pi}{\lambda_m F}\rho r\right)\exp[in(\theta - \phi)]. \tag{18}$$

which allows for Eq. 17 to be rewritten as $$\mathcal{F}\left\{\delta(\rho - \rho_0)\exp\left\{-\frac{\phi^2}{(\beta\pi)^2}\right\}\exp(im\phi)\right\} = \sum_{n=-\infty}^{+\infty}(-i)^n\exp(in\theta) \tag{19}$$

$$\int_0^{\infty}\delta(\rho - \rho_0)J_l\left(\frac{2\pi}{\lambda_m F}\rho r\right)\rho d\rho\int_{-\pi}^{\pi}\exp\left[-\frac{\phi^2}{(\beta\pi)^2} + i\phi(m - n)\right]d\phi.$$

The azimuthal integral can be solved by $$\int_{-\pi}^{\pi}\exp\left[-\frac{\phi^2}{(\beta\pi)^2} + i\phi(m - n)\right]d\phi = \frac{-i\beta\pi\sqrt{\pi}}{2} \tag{20}$$

$$\exp\left(-\frac{(\beta\pi)^2(m - n)^2}{4}\right)\left[erfi\left(\frac{i}{\beta} + \frac{\beta\pi(m - n)}{2}\right) - erfi\left(-\frac{i}{\beta} + \frac{\beta\pi(m - n)}{2}\right)\right] =$$

$$\beta\pi\sqrt{\pi}\exp\left(-\frac{(\beta\pi)^2(m - n)^2}{4}\right)\text{Im}\left[erfi\left(\frac{i}{\beta} + \frac{\beta\pi(m - n)}{2}\right)\right].$$

The far field light distribution in Eq. (15) reduces to the final analytic terms as given by Eq. (9), in which the Bn term is the weighting term and shifts power between different Bessel terms. Considering the $\alpha$=0 case, given n=m+k=l+k, k=0, 1, 2 . . .

$$B_{n=l+k} = \tag{21}$$

$$(-i)^{l+k-1}2\exp\left(-\frac{(\beta\pi)^2(l - (l + k))^2}{4}\right)\text{Im}\left[erfi\left(\frac{i}{\beta} + \frac{\beta\pi(l - (l + k))}{2}\right)\right] =$$

$$(-i)^{l+k-1}2\exp\left(-\frac{(k\beta\pi)^2}{4}\right)\cdot\text{Im}\left(erfi\left(\frac{i}{\beta} - \frac{k\beta\pi}{2}\right)\right).$$

When using the case where n=m−k=l−k, $$B_{n=l-k} = \tag{22}$$

$$(-i)^{l-k-1}2\exp\left(-\frac{l - (l - k)^2(\beta\pi)^2}{4}\right)\text{Im}\left[erfi\left(\frac{i}{\beta} + \frac{(l - (l - k))\beta\pi}{2}\right)\right] =$$

$$(-i)^{l-k-1}2\exp\left(-\frac{(k\beta\pi)^2}{4}\right)\cdot\text{Im}\left(erfi\left(\frac{i}{\beta} + \frac{k\beta\pi}{2}\right)\right).$$

Since the imaginary error function is an odd function, we have $$B_{n=l-k} = (-i)^{l-k-1} 2\exp\left(-\frac{(k\beta\pi)^2}{4}\right) \cdot \text{Im}\left[erfi\left(\frac{i}{\beta} + \frac{k\beta\pi}{2}\right)\right] = \quad (23)$$

$$\frac{(-i)^{l+k-1}}{(-i)^{2k}} 2\exp\left(-\frac{(k\beta\pi)^2}{4}\right) \cdot \text{Im}\left(-erfi\left(-\frac{i}{\beta} - \frac{k\beta\pi}{2}\right)\right) =$$

$$(-1)^k(-i)^{l+k-1} 2\exp\left(-\frac{(k\beta\pi)^2}{4}\right) \cdot \text{Im}\left(-erfi\left(-\frac{i}{\beta} - \frac{k\beta\pi}{2}\right)\right) =$$

$$(-1)^k(-i)^{l+k-1} 2\exp\left(-\frac{(k\beta\pi)^2}{4}\right) \cdot \text{Im}\left(-erfi(\overline{\frac{i}{\beta} - \frac{k\beta\pi}{2}})\right) =$$

$$(-1)^k(-i)^{l+k-1} 2\exp\left(-\frac{(k\beta\pi)^2}{4}\right) \cdot \overline{\text{Im}(-erfi\left(\frac{i}{\beta} - \frac{k\beta\pi}{2}\right))} = (-1)^k B_{n=l+k}.$$

This system can be a receiver as well as a transmitter. This system can also be used in reverse so that the system provides for a sensor to detect beams with OAM. Instead of generating specific OAM modes corresponding to the RF driving frequency, the AOD can scan through the frequency range to detect the OAM charge number of incoming beams. In the embodiment, the input beam can enter a first telescope and be directed into the log polar optics. The beam can enter into a second telescope and be directed into the AOD. A fiber detector can then receive the beam.

Figure 13:
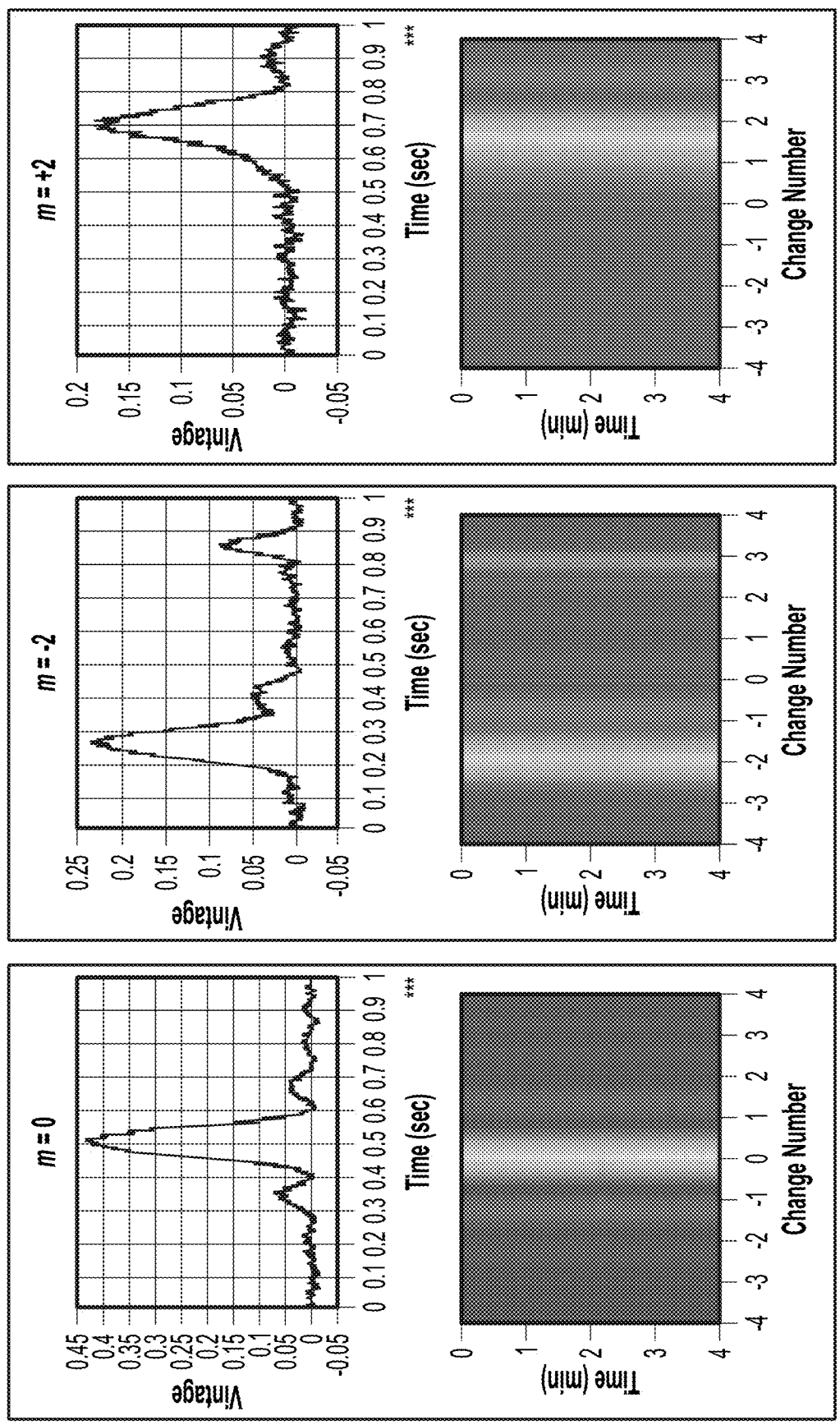
FIG. 13 is an illustration of aspects and results of the system.

Individual beams with OAM modes of m=0 (left), m=−2 (middle) and m=+2 (right) were examined using the system. The results shown in FIG. 13 can indicate a single scan in time of frequencies applied to the AOD that correspond to a scan of OAM modes of m=−4 to m=+4. Because of the speed of the AOD, the change in the OAM mode can be monitored in time as shown in the bottom row of figures, resulting in a dynamic OAM mode sorter.

The acousto-optic deflector can include crystals that can be used as Q-switch modulators in solid state lasers. Since these are used intracavity, they have a large optical power handling capacity and have typical damage thresholds on the order of MW/cm². The switching speed of the present system can be determined by the acoustic wave velocity in the AOD and the input beam size. The switching speed of the current system has been demonstrated to be on the order of 400 kHz, which is much faster than traditional DMD/SLM systems.

Figure 12A:
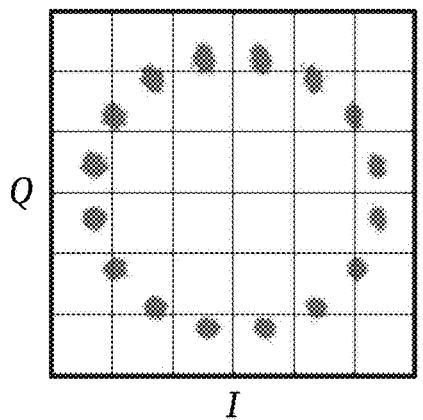
FIG. 12A is an illustration of aspects and results of the system.
Figure 12B:
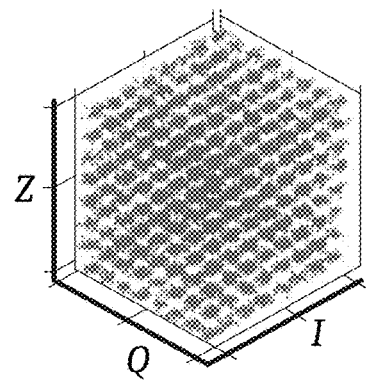
FIG. 12B is an illustration of aspects and results of the system.

Referring to FIGS. 12A and 12B, the AOD can be driven with a single frequency or multiple frequencies. Multiple frequencies that generate charges +m and −m can be applied to the AOD simultaneously to create coherently combined OAM modes. The deflection of both charge +m and −m can be $1^{st}$ order deflections with slightly different deflection angles. Information can be encoded onto both the amplitude and relative phase of the coherently coupled OAM modes and mapped to a three-dimensional constellation space. The 3D quadrature amplitude modulation (QAM) constellation can be based on a higher-order Poincare sphere equivalent for OAM states. In one example of the system, a 532 nm laser can be used with two coherent OAM charges of m=±2 are generated after passing through the system by applying frequencies f+2≈124.28 MHz and f−2≈125.72 MHz simultaneously to the AOD. Two different modulation schemes can be applied to the acoustic cell to control the output beam. A 16-PSK signal and a 512-QAM signal with the modulation rate of 200 kHz are shown in FIGS. 12A and 12B. This system can have advantages directed to improving the spectral efficiency of a communications link. This system can improve upon and advantage to encoding schemes and multiplexing techniques in both free-space and optical fiber-based communication links. Optical beams can be used as a data carrier for both free-space and underwater communications.

The system can be adapted to operate at about a 450 nm wavelength so that the diode amplitude can be controlled by an external signal. The AOD can be used to produce multiple interfering OAM beams simultaneously. Due to the traveling wave in the AOD, different OAM beams can have a small shift in the optical frequency, producing a continuously changing interference pattern due to the continuous change in phase of the sinusoidal waves on the AOD. The diode amplitude can be pulsed as a method of sampling the output beam similar to a strobe light. If the pulse width is on the order of the rate of change of the interference pattern, and repeats periodically, in synchronization with the signal applied to the AOD, the beam profile can be sampled and temporally controlled.

In one example of the system in operation, the laser source is a ThorLabs LP450-SF15 single-mode fiber-pigtailed diode placed in a ThorLabs LDM9LP pigtailed driver mount. The output is then polarized vertically and resized to approximately 3 mm in diameter where it is passed through the AOD. The output of the AOD is then shaped into a line approximately 3 mm by 0.3 mm using a soft aperture. The line is then passed through the log-polar optical transformation system after which a 400 mm lens is used to image the far field beam profile onto a Spiricon SP300 CCD camera with an integration time of 10 ms and a frame rate of 30 Hz. The voltage signals applied to the AOD is V=sin($2\pi f_1 t$)+sin($2\pi f_2 t+\theta$) to generate two different structures as shown in FIGS. 14A and 14B. The first signal has frequencies f1=95.4 MHz and f2=84.6 MHz to create a beam with m=±1 and the second signal has f1=100.9 MHz and f2=79.1 MHz to create a beam with m=±2 for a beat frequency of 10.9 MHz and 21.8 MHz respectfully. This rotation far exceeds the framerate of the CCD array and therefore the average image is collected and appears as a ring. FIGS. 14A and 14B illustrate the time-averaged signal of the system output for a two-beam combination of m=±1 and m=±2.

In one example, a 20 ns Gaussian pulse was applied to the diode at a repetition rate of 3 MHz which can be greater than the switching speed of the AOD; limited by the velocity of the acoustic wave and the beam diameter. The voltage signal applied to the AOD can have the same repetition rate. The CCD array can integrate with approximately 30,000 pulses per frame, timed so that the pulse is synced with the signal applied to the AOD. This pulse can be coupled with a DC bias current using a bias-tee located inside a laser diode mount. The DC bias applied to the laser diode can be set to about 30 mA and/or a level just above the threshold. In conjunction with the pulse and the losses in the optical system, the output pulse incident on the CCD array can have a peak power of 17 mW. In addition, the relative phase between the two signals θ can be adjusted to rotate the interference fringes. These profiles are shown in FIGS. 15a and 15b. for four different phase levels. Due to the continuous rotation, the pulse and the AOD signal must be properly aligned to sample the proper beam combination. FIGS. 15A and 15B illustrate a time-averaged signal of the system output with a 20 ns Gaussian amplitude pulse for a two-beam combination of FIG. 15A m=±1 and FIG. 15B m=±2. These images show the expected interference pattern, where the number of fringes is equal to the difference in charge number. In addition, the apparent rotation angle is proportional to this difference as can be seen. The FWHM of the pulse is approximately 12% of the rotation rate for the first case and approximately 26% for the second. This difference is due to the required frequencies listed above, causing a faster rotation rate for the larger beams. This indicates that there will still be some blurring of the beam over the pulse which could impact sensing systems. It is understood that the above descriptions and illustrations are intended to be illustrative and not restrictive. It is to be understood that changes and variations may be made without departing from the spirit or scope of the following claims. Other embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventor did not consider such subject matter to be part of the disclosed inventive subject matter.

What is claimed is:

1. A tunable orbital angular momentum system comprising:
an acousto-optic deflector adapted to receive an input beam deflected along an optical axis when a voltage is applied to the acousto-optic deflector wherein the acousto-optic deflector outputs a first output beam having a first deflection beam and a second deflection beam wherein the first deflection beam is in a tilted phase relative to an axis of propagation;
a line generator disposed along the optical axis adapted to receive the first output beam and provide a second output beam having an elliptical beam; and,
a log-polar optics assembly disposed along the optical axis adapted to receive the second output beam and adapted to transform the second output beam into a third output beam having an asymmetric annular-distribution and to provide a fourth output linear phase wrapped into an asymmetric ring with azimuthal orbital angular momentum phase wherein the log-polar optics assembly includes a first log-polar optic and a second log-polar optic cooperatively associated to map the second output beam to an asymmetric ring profile.

2. The system of claim 1 wherein the input beam includes a flat wavefront.

3. The system of claim 1 wherein the log-polar optics assembly is adapted to provide an elliptical Gaussian beam having an azimuthal orbital angular momentum phase.

4. The system of claim 1 wherein the second output beam is an elliptical beam with an elongated length, a suppressed height and a phase tilt along a horizontal direction specific to an applied acoustic frequency.

5. The system of claim 1 including a Fourier lens adapted to receive the fourth output prior to the fourth output being provided.

6. The system of claim 1 wherein the first log-polar optic and the second log-polar optic cooperatively associated to map the second output beam to a phase-corrector adapted to correct a phase distortion introduced by a wrapper.

7. The system of claim 1 wherein the input beam is a Gaussian input.

8. The system of claim 1 including a first telescope adapted to receive the input beam prior to the input beam being received by the log-polar optics assembly.

9. The system of claim 1 including a second telescope adapted to receive an output beam from the log-polar optics assembly and project the output beam to the acousto-optic deflector.

10. A tunable orbital angular momentum system comprising:
an acousto-optic deflector adapted to receive an input beam deflected along an optical axis when a voltage is applied to the acousto-optic deflector wherein the acousto-optic deflector outputs a first output beam having a first deflection beam and a second deflection beam wherein the first deflection beam is in a tilted phase relative to an axis of propagation;
a line generator disposed along the optical axis adapted to receive the first output beam and provide a second output beam having an elliptical beam;
a log-polar optics assembly disposed along the optical axis adapted to receive the second output beam and adapted to transform the second output beam into a third output beam having an asymmetric annular-distribution and to provide a fourth output linear phase wrapped into an asymmetric ring with azimuthal orbital angular momentum phase; and,
a deflection angle defined by the first deflection beam and the second deflection beam that is continuously tunable by adjusting a frequency of an acoustic signal of the acousto-optic deflector.

11. The system of claim 10 including a first 4-f line generator adapted to image the first deflection beam into a line shape beam's linear phase.

12. The system of claim 10 including a second 4-f line generator adapted to elongate a circular input beam into the input beam.

13. The system of claim 10 wherein the line generator is configured to shape the first deflection beam and the second deflection beam of the input beam into an elliptical Gaussian beam using a first lens and a second lens.

14. The system of claim 10 wherein the acousto-optical deflector is adapted to add a linear phase gradient to the input beam.

15. The system of claim 10 wherein the line generator is adapted to elongate the first deflection beam and the second deflection beam of the input beam into an elliptical Gaussian line.

16. A tunable orbital angular momentum system comprising:
an acousto-optic deflector adapted to receive an input beam deflected along an optical axis wherein the acousto-optic deflector outputs a first output beam having a first deflection beam and a second deflection beam;
a line generator disposed along the optical axis adapted to receive the first output beam and provide a second output beam having an elliptical beam;
a log-polar optics assembly disposed along the optical axis adapted to receive the second output beam and adapted to transform the second output beam into a third output beam having an asymmetric annular-distribution to provide a fourth output linear phase wrapped into an asymmetric ring with azimuthal orbital angular momentum phase, wherein the fourth output is a wrapped elliptical Gaussian beam adapted for secure digital communication; and, a Fourier lens adapted to receive the fourth output prior to the fourth output being provided.

17. The system of claim 16 wherein the fourth output is an optical beam carrying digital data.

18. A tunable orbital angular momentum system comprising:
   an acousto-optic deflector adapted to receive an input beam deflected along an optical axis wherein the acousto-optic deflector outputs a first output beam having a first deflection beam and a second deflection beam;
   a line generator disposed along the optical axis adapted to receive the first output beam and provide a second output beam having an elliptical beam;
   a log-polar optics assembly disposed along the optical axis adapted to receive the second output beam and adapted to transform the second output beam into a third output beam having an asymmetric annular-distribution to provide a fourth output linear phase wrapped into an asymmetric ring with azimuthal orbital angular momentum phase; and,
   wherein the fourth output is a wrapped elliptical Gaussian beam adapted to manage spatial coherence of beams for structured light imaging.

19. The system of claim 18 wherein the acousto-optic deflector can include a crystal adapted as a Q-switch modulators in a solid state laser.

20. A tunable orbital angular momentum system comprising:
   an acousto-optic deflector adapted to receive an input beam deflected along an optical axis wherein the acousto-optic deflector outputs a first output beam having a first deflection beam and a second deflection beam;
   a line generator disposed along the optical axis adapted to receive the first output beam and provide a second output beam having an elliptical beam; and,
   a log-polar optics assembly disposed along the optical axis adapted to receive the second output beam and adapted to transform the second output beam into a third output beam having an asymmetric annular-distribution to provide a fourth output linear phase wrapped into an asymmetric ring with azimuthal orbital angular momentum phase wherein the fourth output includes multiple modes; and,
   wherein the multiple modes are provided by applying a superposition of multiple RF frequencies.

21. The system of claim 20 wherein the multiple modes include factional modes.

22. A tunable orbital angular momentum system comprising:
   a log-polar optics assembly adapted to receive an input beam having an orbital angular momentum and provide a first output beam;
   an acousto-optic deflector adapted to receive the first output beam and scan through a frequency range and detect charge numbers associated with the input beam; and,
   a fiber coupled detector adapted for receiving the first output beam and determining the orbital angular momentum modes.

* * * * *